(12) United States Patent
Choi et al.

(10) Patent No.: US 11,037,687 B2
(45) Date of Patent: Jun. 15, 2021

(54) CO-60 BREEDING REACTOR TANDEM WITH THERMIONIC AVALANCHE CELL

(71) Applicant: UNITED STATES OF AMERICA AS REPRESENTED BY THE ADMINISTRATOR OF NASA, Washington, DC (US)

(72) Inventors: Sang H. Choi, Poquoson, VA (US); Ronald J. Litchford, Tullahoma, TN (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 281 days.

(21) Appl. No.: 16/352,409

(22) Filed: Mar. 13, 2019

(65) Prior Publication Data
US 2019/0287687 A1    Sep. 19, 2019

Related U.S. Application Data

(60) Provisional application No. 62/642,198, filed on Mar. 13, 2018.

(51) Int. Cl.
G21C 3/40    (2006.01)
G21C 1/02    (2006.01)
(Continued)

(52) U.S. Cl.
CPC ............... G21C 1/02 (2013.01); G21C 3/40 (2013.01); G21C 15/04 (2013.01); G21H 1/103 (2013.01); G21D 7/04 (2013.01)

(58) Field of Classification Search
CPC . G21C 1/02; G21C 3/40; G21C 15/04; G21H 1/103; G21D 7/04
(Continued)

(56) References Cited

U.S. PATENT DOCUMENTS 4,497,973 A    2/1985  Heath et al.
10,269,463 B2  4/2019  Choi et al.
(Continued)

OTHER PUBLICATIONS

Moses, "Maintaining human health for humans-mars", In 2018 AIAA SPACE and Astronautics Forum and Exposition, pp. 1-18. (Year: 2018).*
(Continued)

*Primary Examiner* — Jack W Keith
*Assistant Examiner* — Daniel Wasil
(74) *Attorney, Agent, or Firm* — M Bruce Harper; Jennifer L. Riley; Helen M. Galus

(57) ABSTRACT

Systems, methods, and devices of the various embodiments enable a Nuclear Thermionic Avalanche Cell (NTAC) to capture gamma ray photons emitted during a fission process, such as a fission process of Uranium-235 (U-235), and to breed and use a new gamma ray source to increase an overall emission flux of gamma ray photons. Various embodiments combine a fission process with the production of Co-60, thereby boosting the output flux of gamma ray photons for use by a NTAC in generating power. Various embodiments combine a fission process with the production of Co-60, a NTAC generating avalanche cell power, and a thermoelectric generator generating thermoelectric power.

17 Claims, 5 Drawing Sheets

(51) Int. Cl.
  *G21C 15/04* (2006.01)
  *G21H 1/10* (2006.01)
  *G21D 7/04* (2006.01)
(58) Field of Classification Search
  USPC .................................. 376/171, 173, 321
  See application file for complete search history.

(56) References Cited

U.S. PATENT DOCUMENTS

| | | | |
|---|---|---|---|
| 2008/0272680 | A1 | 11/2008 | Perreault |
| 2010/0061503 | A1* | 3/2010 | Popa-Simil .............. G21C 3/40 |
| | | | 376/409 |
| 2013/0125963 | A1 | 5/2013 | Binderbauer et al. |
| 2015/0188019 | A1 | 7/2015 | Corrado |
| 2016/0225476 | A1* | 8/2016 | Choi ..................... G21H 1/103 |
| 2017/0288113 | A1 | 10/2017 | Choi et al. |
| 2018/0350481 | A1 | 12/2018 | Choi et al. |

OTHER PUBLICATIONS

Murray, "Thermophotovoltaic converter design for radioisotope power systems", In AIP Conference Proceedings, vol. 738, No. 1, pp. 123-132, American Institute of Physics, 2004. (Year: 2004).*
L. Popa-Simil, I.L. Popa-Simil, "Nano Hetero Nuclear Fuel Structure," NSTI-Nanotech, 2007, vol. 1, LAVM LLC, Los Alamos, NM 87544.
Narducci, D., "Do we really need high thermoelectric figures of merit? A critical appraisal to the power conversion efficiency of thermoelectric materials," Appl. Phys. Lett., 2011, pp. 17-20, 99(10).
Stordeur, M. et al., "Low power thermoelectric generator—self-sufficient energy supply for micro systems," 16th Int. Conf. Thermoelectr., 1997, pp. 575-577.
National Aeronautics and Space Administration., "Radioisotope power systems: radioisotope thermoelectric generator (RTG)," 2013, <https://solarsystem.nasa.gov/rps/rtg.cfm> (Jan. 6, 2017 ).
Koelle, D. et al., "Development and transportation costs of space launch systems," Proc. DGLR/CEAS Eur. Air Sp. Conf. (2007).
Swanson, R. M., "A proposed thermophotovoltaic solar energy conversion system," Proc. IEEE, 1979, pp. 446-447, 67(3).
Schock, A. et al., "Design, analysis, and optimization of a radioisotope thermophotovoltaic (RTPV) generator, and its applicability to an illustrative space mission," Acta Astronaut. 37(C), 1995, pp. 21-57.
Ferrari, C. et al., "Overview and status of thermophotovoltaic systems," Energy Procedia 45, 2014, pp. 160-169.
Bermel, P. et al., "Design and global optimization of high-efficiency thermophotovoltaic systems.," Opt. Express 18 Suppl, 2010, pp. A314-A334, 3(103).
Nelson, R. E., "A brief history of thermophotovoltaic," Semicond. Sci. Technol. 2003, pp. S141-S143, 18.
Crowley, C. J. et al., "Thermophotovoltaic converter performance for radioisotope power systems," AIP Conf. Proc. 2005, 746, pp. 601-614.
Coutts, T. J. "Overview of thermophotovoltaic generation of electricity," Sol. Energy Mater. Sol. Cells, 2001, pp. 443-452, 66(1-4).
Molesky, S. et al., "Ideal near-field thermophotovoltaic cells," Phys. Rev. B, 2015, pp. 1-7, 91(20).
Sulima, O.V. et al., "Fabrication and simulation of GaSb thermophotovoltaic cells," Sol. Energy Mater. Sol. Cells, 2001, pp. 533-540, 66(1-4).
Coutts, T. J., "Review of progress in thermophotovoltaic generation of electricity," Renew. Sustain. energy Rev. 1999, pp. 77-184, 3(2).
Shakouri, A., "Thermoelectric , thermionic and thermophotovoltaic energy conversion J Q (r) q Report Documentation Page", 2005.
Rosaire, C. G. et al., "Radioisotope thermophotovoltaic batteries for universal low power systems," Nucl. Emerg. Technol. Space, NETS, 2013, pp. 419-427.

Cheetham, K. J. et al., "Low bandgap GaInAsSbP pentanary thermophotovoltaic diodes," Sol. Energy Mater. Sol. Cells, 2011, pp. 534-537, 95(2).
Nagpal, P. et al., "Efficient low-temperature thermophotovoltaic emitters from metallic photonic crystals," Nano Lett., 2008, pp. 3238-3243, 8(10).
Durisch, W. et al., "Novel thin film thermophotovoltaic system," Sol. Energy Mater. Sol. Cells, 2010, pp. 960-965, 94(6).
Schock, A. et al., "Design and integration of small RTPV generators with new millennium spacecraft for outer solar system," Acta Astronaut, 1997, pp. 801-816, 41(12).
Gerstenmaier, Y. C. et al., "Efficiency of thermionic and thermoelectric converters," AIP Conf. Proc., 2007, pp. 37-46, 890.
Oman, H. "Deep space travel energy sources," IEEE Aerosp. Electron. Syst. Mag., 2003, 18(2), 28.
Humphrey, T. E. et al., "Power optimization in thermionic devices," J. Phys. D. Appl. Phys., 2005, pp. 2051-2054, 38(12).
Trucchi, D. M. et al., "Thermionic Emission □ : A Different Path to Solar Thermal Electricity," SolarPaces Conf. (2012).
Schwede, J. W. et al., "Photon-enhanced thermionic emission for solar concentrator systems," Nat. Mater., 2010, pp. 762-767, 9(9),Nature Publishing Group.
Adams, S. F., "Solar thermionic space power technology testing: A historical perspective," AIP Conf. Proc., 2006, pp. 590-597, 813.
Ha, C. T. et al., "Advanced stirling radioisotope generator: Design processes, reliability analyses impacts, and extended operation tests," AIP Conf. Proc., 2008, pp. 458-465, 969.
Chan, J. et al., "Development of advanced Stirling Radioisotope Generator for space exploration," AIP Conf. Proc. , May 2007, pp. 615-623, 880.
Wong, W. A. et al., "Advanced Stirling convertor ( ASC )—from technology development to future flight product," 2008, pp. 1-26.
Cockfield, R. D. et al., "Stirling radioisotope generator for mars surface and deep space missions," 2002 37th Intersoc. Energy Conyers. Eng. Conf., 2002, pp. 134-139.
Shaltens, R. K. et al., "Advanced Stirling technology development at NASA Glenn Research Center," NASA Sci. Technol. Conf.(Sep. 2007).
Oriti, S. M., "Advanced Stirling Radioisotope Generator Engineering Unit 2 ( ASRG EU2 ) final assembly" (2015).
Mason., L. S. et al., "Modular stirling radioisotope generator," 13th Int. Energy Conyers. Eng. Conf., 2015, 3809.
Chan, T. S., "System-level testing of the advanced Stirling radioisotope generator engineering hardware," 12th Int. Energy. Conyers. Eng. Conf. (2014).
Chan, J. et al., "Advanced stirling radioisotope generator emergency heat dump test for nuclear safety consideration," 9th Annu. Int. Energy Conyers. Eng. Conf. IECEC 2011 (2011).
Leonov, V et al., "Wearable thermoelectric generators for body-powered devices," J. Electron. Mater., 2009, pp. 1491-1498, 38(7).
Leonov, V et al., "Thermoelectric and hybrid generators in wearable devices and clothes," Proc.—6th Int. Work. Wearable Implant. Body Sens. Networks, 2009, pp. 95-200.
Wang Z. L et al., "Realization of a wearable miniaturized thermoelectric generator for human body applications," Sensors Actuators, A Phys. 2009, pp. 95-102, 156(1).
Leonov, V, "Thermoelectric energy harvesting of human body heat for wearable sensors," IEEE Sens. J., 2013, pp. 2284-2291 , 13(6).
Kim, M.K. et al., "Wearable thermoelectric generator for human clothing applications," 2013 Transducers Eurosensors XXVII 17th Int. Conf. Solid-State Sensors, Actuators Microsystems(June), 2013, pp. 1376-1379.
He, W. et al., "Recent development and application of thermoelectric generator and cooler," Appl. Energy, 2015, pp. 1-25, 143.
Bank, J. H. et al., "Flexible thermoelectric materials and device optimization for wearable energy harvesting," J. Mater. Chem. C 3, 2015, pp. 10362-10374.
Sebald, G. et al., "On thermoelectric and pyroelectric energy harvesting," Smart Mater. Struct. 2009, p. 25006, 18(12).
Miotla, D., "Assessment of plutonium-238 production alternatives," Apr. 21, 2008 (available at http://energy.gov/sites/prod/files/NEGTN0NEAC_PU-238_042108.pdf).

(56) References Cited

OTHER PUBLICATIONS

National Aeronautics and Space Administration., "What is plutonium-238 □," <https://solarsystem.nasa.gov/rps/docs/APP RPS PU-238 FS 12-10-12.pdf> (Jan. 25, 2016).

Howe, S. D. et al., "Economical production of Pu-238," Nucl. Emerg. Technol. Sp. (NETS 2013) 2013, pp. 1-12, 238.

Wall, M., "Full-Scale Production of Plutonium Spacecraft Fuel Still Years Away," Space.com, May 17, 2016, (available at http://www.space.com/32890-nuclear-fuel-spacecraft-production-plutonium-238.html).

Griggs, M. B., "Plutonium-238 is produced in America for the first time in almost 30 Years," Pop. Sci., Dec. 23, 2015 (available at http://www.popsci.com/plutonium-238-is-produced-in-america-for-first-time-in-30-years).

Szondy, D., "US restarts production of plutonium-238 to power space missions," New Atlas, Dec. 23, 2015 (available at http://newatlas.com/oml-plutonium-238-production-space/41041/).

* cited by examiner

CO-60 BREEDING REACTOR TANDEM WITH THERMIONIC AVALANCHE CELL

CROSS-REFERENCE TO RELATED PATENT APPLICATION(S)

This patent application claims the benefit of and priority to U.S. Provisional Application No. 62/642,198, filed on Mar. 13, 2018, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Typical direct energy conversion systems are based on photovoltaic processes of a single photon to a single electron transfer within the valence band, thermoelectrics of thermally agitated electrons, fuel cells of chemically deprived electrons, or magnetohydrodynamic generators of electrons in free-to-free transition. These systems have respective intrinsic limits to generate a number of useful electrons for power conversion since these systems use the electrons only in the valence band. Accordingly, the overall energy density of typical direct energy conversion systems is intrinsically poor.

Some types of systems that use radioactive decay processes, such as alpha or beta batteries, are widely mentioned, but the fundamental underlying principles, the technical contents, and the ways to build are not clearly defined. Nuclear batteries or nuclear capacitors have a serious problem with harnessing electrons from the valence band of materials using the unusually low energy capacity of the alpha and beta particles. The energy and number of beta particles emitted from a radioactive decay process are very small, resulting in the conversion systems using these beta particles having very small power densities. Even high energy beta particles do not have a long mean free path due to the Coulomb scattering and so are not able to penetrate much into the morphological orders of materials. Current nuclear batteries subsidize the beta decay electrons and the alpha particles to generate electron disparity of a p-n junction that creates anisotropic electron plasma, subjecting to the Brillouin limit within the frame of the valence band. In such a p-n junction, the available number of electrons are limited to a few Coulombs per cubic centimeter. Therefore, these nuclear batteries only render a low energy density system.

BRIEF SUMMARY OF THE INVENTION

Systems, methods, and devices of the various embodiments enable a Nuclear Thermionic Avalanche Cell (NTAC) to capture gamma ray photons emitted during a fission process, such as a fission process of uranium-235 (U-235), and at the same time to breed and use a new gamma ray source to increase an overall emission flux of gamma ray photons. Various embodiments combine a fission process with the production of cobalt-60 (Co-60), thereby boosting the output flux of gamma ray photons for use by a NTAC in generating power. Various embodiments combine a fission process with the production of Co-60, a NTAC generating avalanche cell power, and a thermoelectric generator generating thermoelectric power. The various embodiments may solve problems associated with the short supply of radio-isotopes and solve problems with the low flux density of gamma ray photons from radio-isotopes.

Various embodiments may include a reactor system, including a containment vessel and one or more fission process reactor units supported within the containment vessel, each of the one or more fission process reactor units comprising a radioactive element, a cobalt-59 (Co-59) layer, a NTAC, and a thermoelectric generator, wherein a fission process of the radioactive element releases neutrons to the Co-59 layer to breed Co-60, the NTAC receives gamma rays from the fission process, a by-product of the fission process, and the bred Co-60 to generate direct current (DC) power, and the thermoelectric generator receives thermal energy from the radioactive element and the NTAC to generate DC power. In some embodiments, the reactor system may include a fluid circulated within the containment vessel, such as argon gas. In some embodiments, the radioactive element may include U-235 and the by-product of the fission process is cesium-137 (Cs-137). In some embodiments, the U-235 is a fuel rod and the fission process is controlled by a primary neutron source rod controllably inserted or removed from the fuel rod. In some embodiments, the Co-59 layer at least partially encircles the U-235 fuel rod. In some embodiments, the Co-59 layer is disposed between the U-235 fuel rod and the NTAC. In some embodiments, the NTAC is disposed between the Co-59 layer and the thermoelectric generator. In some embodiments, the NTAC and the thermoelectric generator are connected in tandem to a same DC bus or load. In some embodiments, the NTAC includes a photoionic electron emitter separated from an electron getter electrode by a thermionic vacuum gap.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments, and together with the general description given above and the detailed description given below, serve to explain the features of the embodiments.

DETAILED DESCRIPTION OF THE INVENTION

Figure 1:
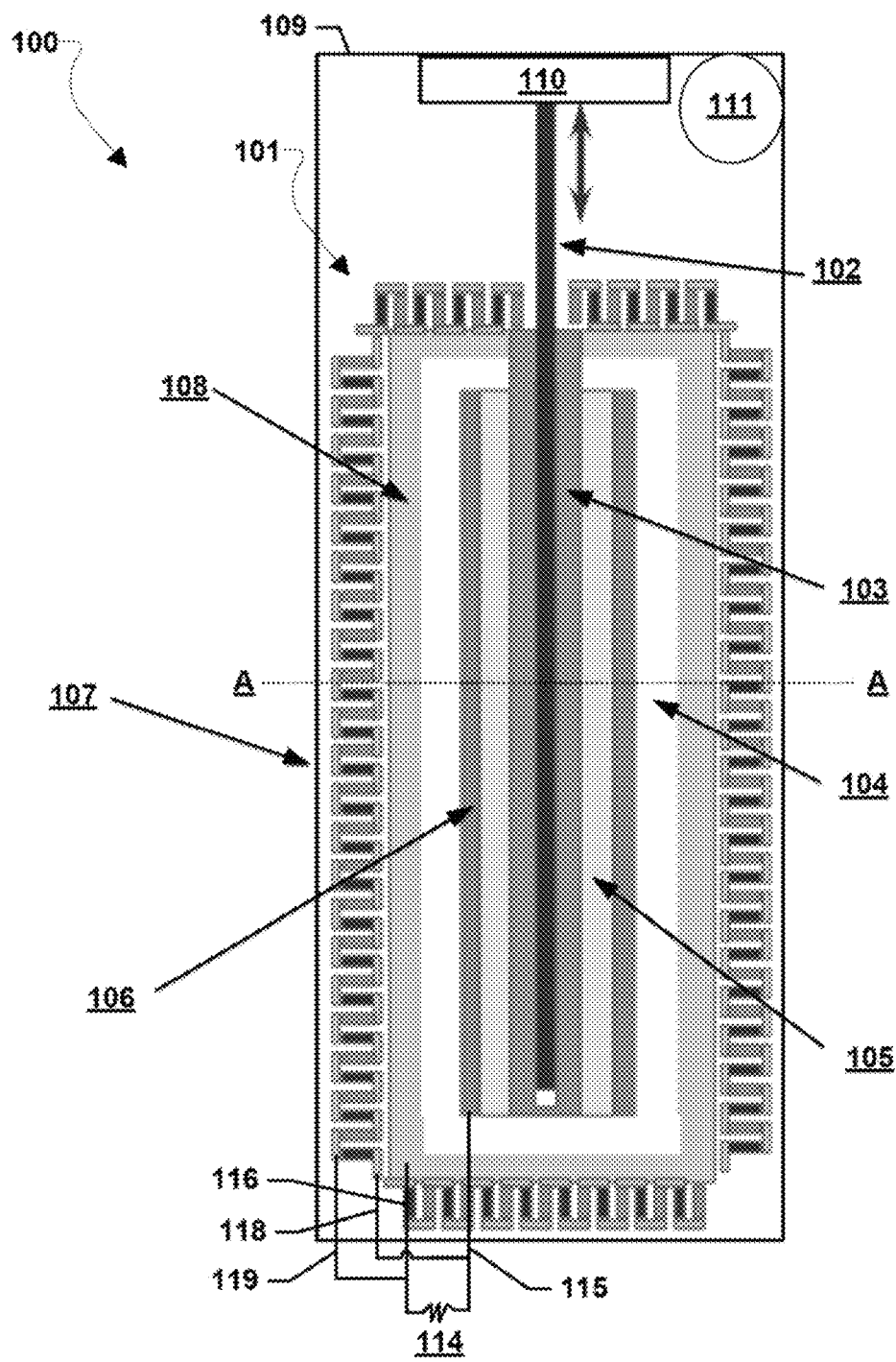
FIG. 1 is component block diagram illustrating a cross section of an embodiment fission process reactor system including a single fission process reactor unit.

For the purposes of the description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

The energy conversion technology referred to as Nuclear Thermionic Avalanche Cells (NTACs) was recently developed at the National Aeronautics and Space Administration's (NASA's) Langley Research Center. NTACs are described in U.S. Patent Application Publication No. 2016/0225476 to Choi et al., the contents of which are hereby incorporated by reference in their entirety.

A NTAC needs gamma ray sources to make a free-to-free transition of intra-band electrons for power generation. Typically known and readily available gamma ray sources are the isotopes of cesium (e.g., cesium-137 (Cs-137), cobalt-60 (Co-60), and sodium-22 (Na-22). The demand of these materials (e.g., Cs-137, Co-60, and Na-22) might increase with the scale of NTAC power generation. Although the yielding rate of Cs-137 is about 6% from nuclear waste of fission processes, the gamma photon flux from Cs-137 is not large since the decay rate is slow. The half-life of Cs-137 is approximately 30 years and proceeds by both beta decay and gamma emission from an intermediate state. Both the electron and gamma emissions are highly ionizing radiation. During a nuclear fission reaction, these isotopes (e.g., Cs-137, Co-60, and Na-22) are also produced and emanate a sufficient amount of gamma photons.

The successful development of NTACs hinges on the flux density of gamma ray photons that will make a huge number of electrons in intra-bands of atom to undergo free-to-free transition. However, not many sources of high flux gamma ray photons are available. Thus, the short supply of radio-isotopes and the low flux density of gamma ray photons from radio-isotopes present a problem to successful developments of NTACs.

Systems, methods, and devices of the various embodiments enable a NTAC to capture gamma ray photons emitted during a fission process, such as a fission process of uranium-235 (U-235), and to breed and use a new gamma ray source to increase an overall emission flux of gamma ray photons. Various embodiments combine a fission process with the production of Co-60, thereby boosting the output flux of gamma ray photons. Various embodiments boost the flux density of gamma ray photons by combining a breeding process of Co-60 with Cs-137 during a fission process. A good number of slow neutrons that are generated under a fission process can be used for breeding Co-60 by neutron injection into cobalt-59 (Co-59) in various embodiments. The Co-60 combined with Cs-137, which is naturally produced from a fission process of uranium-235 (U-235), may drastically increase the gamma ray emission in various embodiments.

Various embodiments enhance high gamma ray emission. The flux density of gamma ray photons is an important factor to determine the NTAC power output. To increase the flux density, in various embodiments, two or more radio-isotopes may be mixed by mass fraction. In various embodiments, directly combining the NTAC with the fission process simplifies the power generation in a single device as a combined cycle. In various embodiments, an added layer of cobalt-59 may be transmitted into cobalt-60 by absorbing a neutron from a fission reactor core. Various embodiments combine a fission process with the production of Co-60, a NTAC generating avalanche cell power, and a thermoelectric generator generating thermoelectric power.

Normally the higher the decay rate is, the higher the flux density is. Also with the flux density the energy of gamma photon determines the total deliverable photon power. A combination of two or three radio-isotopes based on the mass fraction and decay (or operation) time of source materials controls the emission flux of gamma ray photons. For a long operation requirement, the ratio by mass fraction is heavily weighted to Cs-137 with relatively small fraction of Co-60 or Na-22. The necessity of adding Co-60 and Na-22 can be justified for the boosted power achievable a few years from the beginning of operation. Or vice versa is also true for boosting power for a short operation. The total photon power deliverable by Cs-137 may be 0.34 Watts per gram (W/g), the total photon power deliverable by Co-60 may be 9.39 W/g, and the total photon power deliverable by Na-22 may be 47.188 W/g. Accordingly, any ratio of the mixture of these radio-isotopes (i.e., Cs-137, Co-60, and Na-22) can proportionally determine the harnessable power.

In one of the nuclear fission reactions, U-235 absorbs a slow neutron (<2 megaelectronvolt (MeV)) to become U-236. Then U-236 splits into Cs-137 and Rubidium-95 (Rb-95) and simultaneously releases 3 slow neutrons, gamma ray photons (~7 MeV), and 191 MeV of energy as a net conversion of mass reduction through fission process. This fission process creates radio-isotopes, such as Cs-137 and Rb-95, that undergo a decay process by releasing gamma photons and slow neutrons. The fission reaction alone releases ~7 MeV in prompt emission of gamma ray photons. The three additional slow neutrons collide with neighboring U-235 atoms for chain fission reaction. Since each reaction generates 3 slow neutrons, the number of slow neutrons is multiplied over the chain reactions. Throughout the fission reaction, the number of these slow neutrons is continuously increased to a point far more than is necessary for maintaining the chain reactions.

Accordingly, these energetic neutrons (<2 MeV) can be used for breeding other radioisotopes, such as Co-60. For example, if naturally existing cobalt (Co-59) is placed in a fission reactor and bombarded by neutrons, it captures a neutron and becomes Co-60 through a transmutation process. That is, $_{27}^{59}Co + _0^1n \rightarrow _{27}^{60}Co$. The newly created Co-60 undergoes firstly the beta decay into $_{28}^{60}Ni^* + _{-1}^0e$ and then $_{28}^{60}Ni^*$, which is in excited state, takes a transition down to the stable ground state by releasing its own energy as a form of gamma ray photons through a decay process.

In various embodiments, a controllable reactor, such as a U-235 control rod based reactor, may be wrapped with a blanket of Co-59, a NTAC, and a thermoelectric generator. The fission reaction of the controllable reactor generates substantial amount of thermal energy (191 MeV) through its exothermic transmutation process, radioisotopes, neutrons, and gamma ray photons. The absorption of gamma ray photons generates not only a huge number of intraband electrons through the bound-to-free and the free-to-free transitions, but also thermal energy by the multiple scatterings of gamma photons and quenching process of recoiling electrons. Such a large amount of thermal energy is converted by thermoelectric conversion process as a bottoming cycle of the system conversion hierarchy while the thermionic conversion of a huge number of free-to-free transition electrons occurs in the NTAC as a topping cycle.

The various embodiment nuclear fission reactors combined with a NTAC and thermoelectric generator are fundamentally different from the conventional reactors. First the embodiments nuclear fission reactors with a NTAC breed Co-60 as a gamma ray source, in addition to Cs-137 as a fission product. These two gamma ray sources are additive on top of the fission process that alone generates gamma ray photons. Accordingly, the gamma ray photons from fission process (~7 MeV prompt), Cs-137 (0.6617 MeV, 30.17 year), and Co-60 (1.3325 MeV, 5.2714 year) are all combined together to enhance the emission of gamma ray photons. Second, the thermal energy (191 MeV) is a major portion of fission process. This thermal energy is converted by multi junction or metal junction thermoelectric process rather the conventional Rankine cycle using steam in conventional reactors. In this manner, the various embodiment nuclear fission reactors combined with a NTAC and thermoelectric generator generate power directly, rather than through the generation of steam to turn a turbine. Accordingly, no steam or condensate lines may be required in the various embodiments and no turbine is required in the various embodiments to generate electricity. In the various embodiments, the multiple layers encapsulating around the fission core may act to lower the energy of those fast neutrons which are generated through chain reactions of fission. In various embodiments, any rejected heat can be removed by circulating inert gas, such as helium (He) or argon (Ar). At the same time, this intervening gas not only removes the remainder of thermal energy, but also lowers (or slows down) the energy of neutrons.

FIG. 1 is component block diagram illustrating a cross section of an embodiment fission process reactor system 100 including a single fission process reactor unit 101. The fission process reactor unit 101 includes a radioactive element, such as a fission reactor element, combined with a NTAC and thermoelectric generator 107. The fission process reactor unit 101 according to various embodiments boosts the flux density of gamma ray photons by combining the emissions from Co-60, Cs-137, and fission process together as the emission source for the NTAC included in the fission process reactor unit 101. The NTAC may include a photoionic electron emitter 106 separated from an electron getter electrode 108 by a thermionic vacuum gap 104. The radioactive element in the fission process reactor unit 101 may include a radioactive fuel rod 103, such as U-235 fuel rod, with a fission controller, such as a primary neutron source rod 102 lowered and raised into the radioactive fuel rod 103 by a fission control system 110. The fission control system 110 may include various types of mechanical and/or electro-mechanical control elements, such as motors, etc., to raise and/or lower the primary neutron source rod 102 into and out of (i.e., controllably insert/controllably remove) the radioactive fuel rod 103 to control the rate of fission.

In various embodiments, the radioactive element, such as the radioactive fuel rod 103 (e.g., a U-235 fuel rod), may be wrapped (or cladded, plated, or otherwise at least partially encircled) by a layer of Co-59 105. In various embodiments, the fission process of the radioactive element, such as the radioactive fuel rod 103 (e.g., a U-235 fuel rod) is used to breed the Co-60 from the cobalt-59 layer 105 by the bombardment of neutrons generated from fission reaction. The layer of Co-59 105 may not only capture neutrons to be converted to Co-60, but also lower the energy of any passing fast neutrons for controlling the fission process.

In various embodiments, the outside surface of the Co-59 layer 105 is covered by the electron emitter materials of the photoionic electron emitter 502, such as a high Z and f-block material (e.g., lanthanides). This high Z and f-block material receives the combined gamma ray photons from fission process, Cs-137, and the Co-60 which is bred by capturing the neutrons from fission process. The Co-59 layer 105 captures most of neutrons from fission process because it completely (or nearly completely) encapsulates the fission fuel core (e.g., radioactive fuel rod 103). In the same way, the high Z and f-block material receives the most of gamma ray photons that are generated from the encapsulated fission material and the bred Co-60. Under the barrage of gamma ray photons, the f-block material releases a huge number of electrons from their intra-band. These avalanche electrons are emitted outward (i.e., out from the direction of the radioactive fuel rod 103) and cross the vacuum gap 507 and are delivered to the electron getter electrode 108 across the vacuum gap 507 which surrounds the f-block emitter (i.e., the photoionic electron emitter 502). The movement of electrons from the photoionic electron emitter 502 across the vacuum gap 507 and to the electron getter electrode 108 generates direct current (DC) power from the NTAC. In the embodiment fission process reactor unit 101, the gamma ray photons are all combined together; i.e., (1) the gamma ray photons (7 MeV) from the prompt fission reaction; (2) the gamma ray photons (0.6617 MeV) from Cs-137 which is a by-product of fission process, and (3) the gamma ray photons (1.3325 MeV) from Co-60 which is bred from the Co-59 layer 105 by absorbing neutrons within fission reactor. In this manner, the photoionic electron emitter 502 of the NTAC in various embodiments receives greater amounts of gamma rays in the embodiment fission process reactor unit 101 than a NTAC would receive from just the same size of gamma ray source itself in place of U-235 fuel rod.

In various embodiments, the combined thermal energy released from fission process, gamma ray scattering, and electron recoiling process is converted into DC power by the thermoelectric devices forming the thermoelectric generator 107 that cover all around the outside of the electron getter electrode 108. The thermoelectric generator 107 may be an array of interconnected thermoelectric devices. The NTAC may include electrical lead connections 115 and 116 connected to the photoionic electron emitter 502 and the electron getter electrode 108, respectively, which may be connected to a load 114 (or DC bus) to provide DC power from the NTAC to the load 114 (or DC bus). The thermoelectric generator 107 may include electrical lead connections 118 and 119 which may be connected to the load 114 (or DC bus) to provide DC power from the thermoelectric generator 107 to the load 114 (or DC bus). FIG. 1 shows the NTAC and the thermoelectric generator 107 connected to the same load 114

(or DC bus), thereby enabling the system 100 to provide tandem power (i.e., avalanche cell power and thermoelectric power) to the same load 114 (or DC bus). However, the NTAC and the thermoelectric generator 107 need not be connected in tandem to the same load (or bus). Rather, the NTAC and the thermoelectric generator 107 may operate as separate power sources for separate loads (or buses). Regardless of whether the NTAC and the thermoelectric generator 107 are used separately or in tandem, the power generation by the system 100 is by direct energy conversion systems (i.e., via the NTAC and/or the thermoelectric generator 107) which is different from the conventional reactors that generate steam to run a turbine to generate electricity.

In various embodiments, the system 100 may include a containment vessel 109 surrounding and supporting the fission process reactor unit 101. The containment vessel 109 may be filed with a fluid, such as high pressure gas (e.g., helium (He) gas, argon (Ar) gas, etc.) or any other type coolant medium, that may be circulated, such as by a circulation pump 111, to remove waste thermal energy from the fission process reactor unit 101. The fluid, such as Ar gas, He gas, other coolant fluid, etc., may also control the neutron energy desirably.

Figure 2:
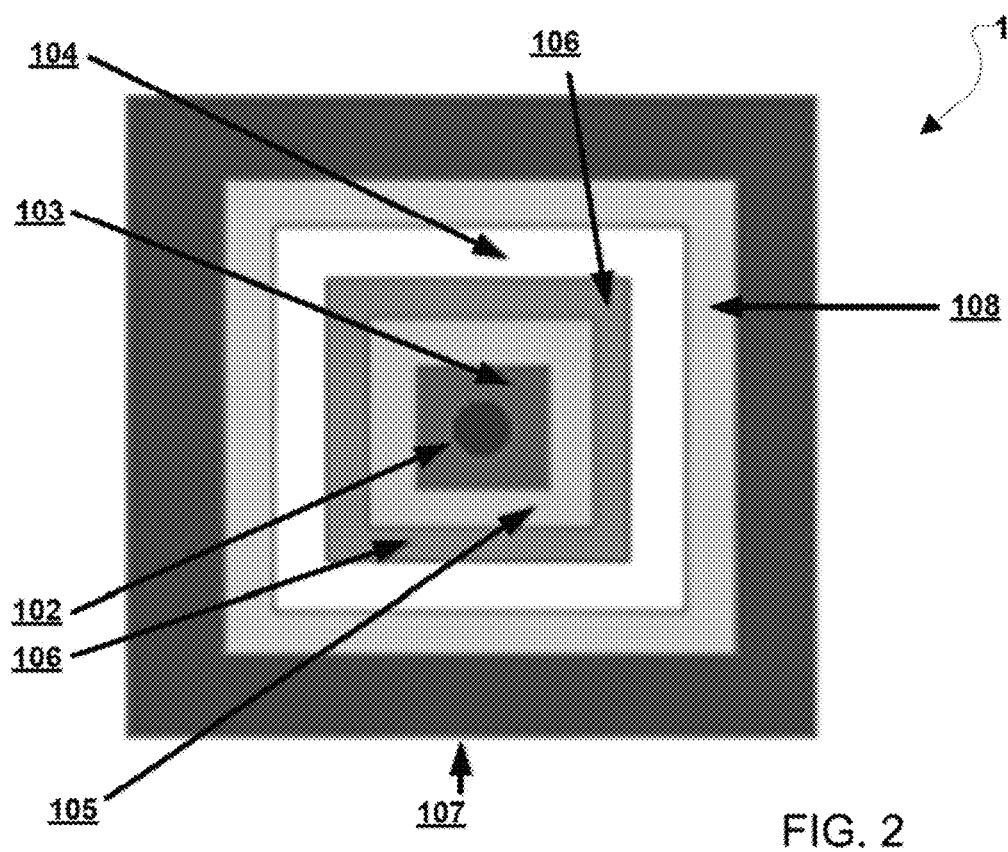
FIG. 2 is a cross section of the fission process reactor unit of FIG. 1 having a circular cross section shape according to an embodiment.
Figure 3:
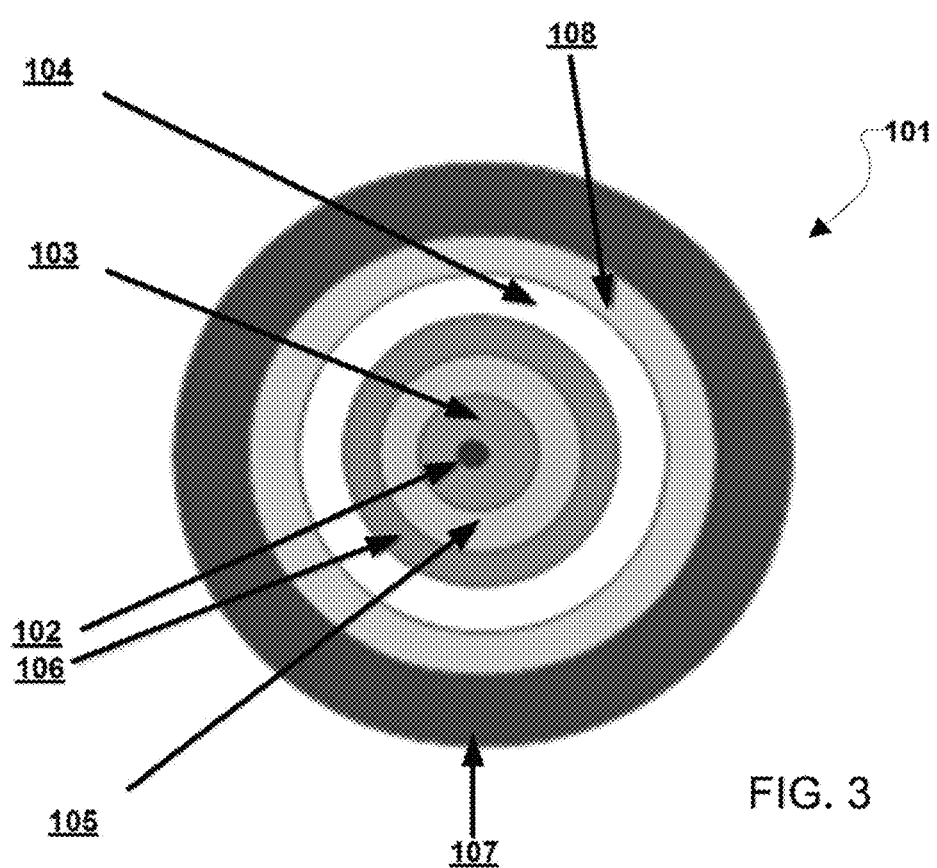
FIG. 3 is a cross section of the fission process reactor unit of FIG. 1 having a square cross section shape according to an embodiment.

In various embodiments, the flux and energy of neutrons from the fission process in the fission process reactor unit 101 may be tailored and controlled for a rightly designed fission reaction through the multiple layers of designed materials that surround the radioactive element, such as the radioactive fuel rod 103 (e.g., a U-235 fuel rod). In various embodiments, the configuration of the layers of the fission process reactor unit 101 may be as circular layers extending out concentrically from the primary neutron source rod 102 such that the fuel rod 103 encircles the primary neutron source rod 102, the Co-59 layer 105 encircles the fuel rod 103, the photoionic electron emitter 106 encircles the Co-59 layer 105, the thermionic vacuum gap 104 encircles the photoionic electron emitter 106, the electron getter electrode 108 encircles the thermionic vacuum gap 104, and the thermoelectric generator 107 encircles the electron getter electrode 108. FIG. 2 illustrates such a circular cross section configuration of the fission process reactor unit 101 of FIG. 1 along the axis A. Similarly, the cross section of the fission process reactor unit 101 may be square shaped with each of the layers of the fission process reactor unit 101 (i.e., the fuel rod 103, the primary neutron source rod 102, the Co-59 layer 105, the photoionic electron emitter 106, the thermionic vacuum gap 104, the electron getter electrode 108, and the thermoelectric generator 107) disposed successively outward from one another as shown in FIG. 3 which illustrates such a square cross section configuration of the fission process reactor unit 101 of FIG. 1 along axis A.

For a large power generation demand, a clustered formation of multiple embodiment fission process reactor units 101 may enable the power generation required by the demand. The addition of more than one fission process reactor unit 101 may allow the power scale up or down in various embodiments. Any number of fission process reactor units 101 may be combined in various configurations inside a same containment vessel. For example, 2, 3, 4, more than 4, 25, more than 25, etc., fission process reactor units 101 may be arranged in various manners inside a containment vessel to support larger power generation demands than a single fission process reactor unit 101 may provide for.

Figure 4:
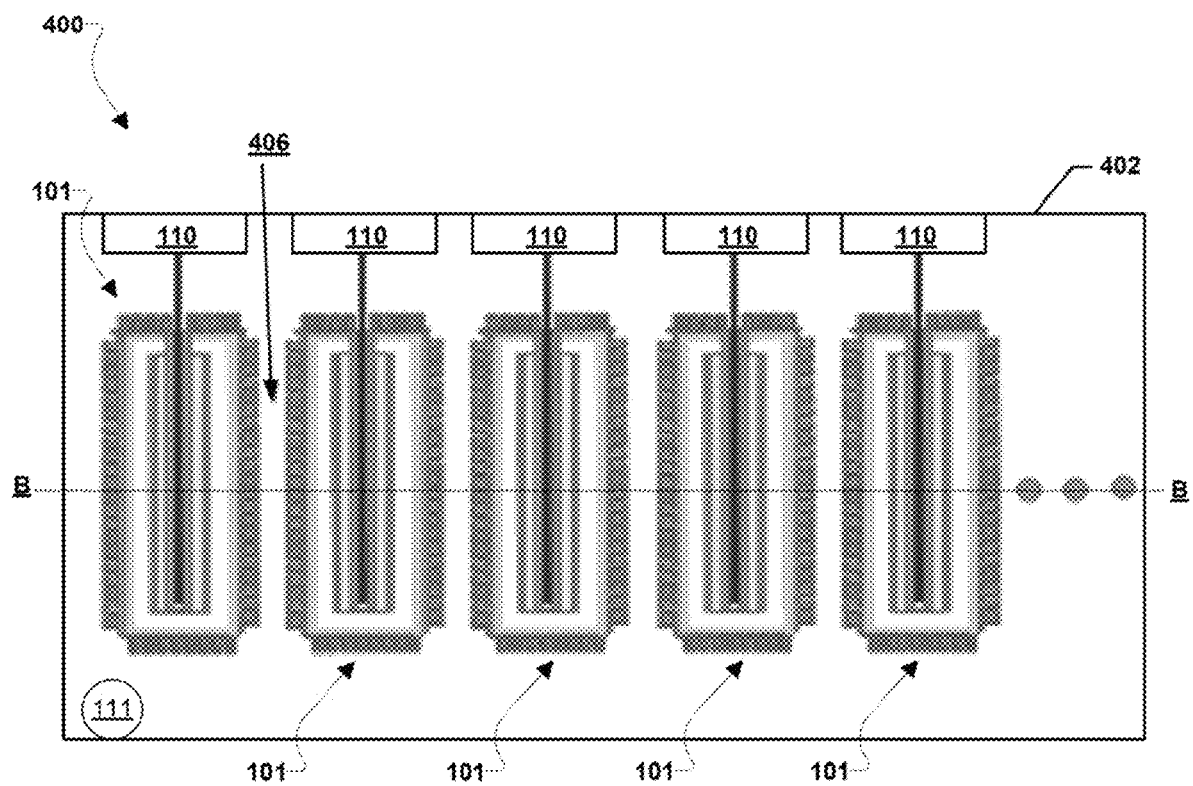
FIG. 4 is component block diagram illustrating a cross section of an embodiment fission process reactor system including multiple fission process reactor units.
Figure 5:
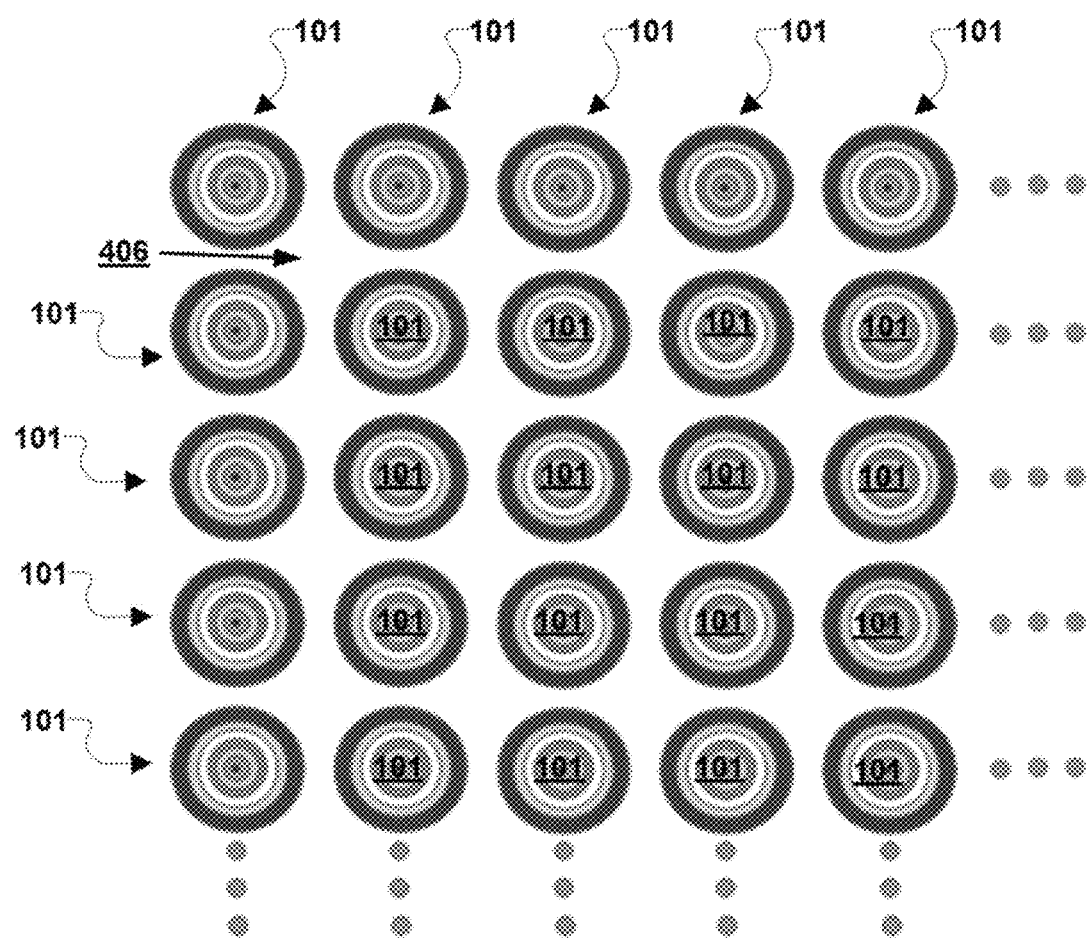
FIG. 5 is a cross section of the fission process reactor units of FIG. 4 having circular cross section shapes according to an embodiment.
Figure 6:
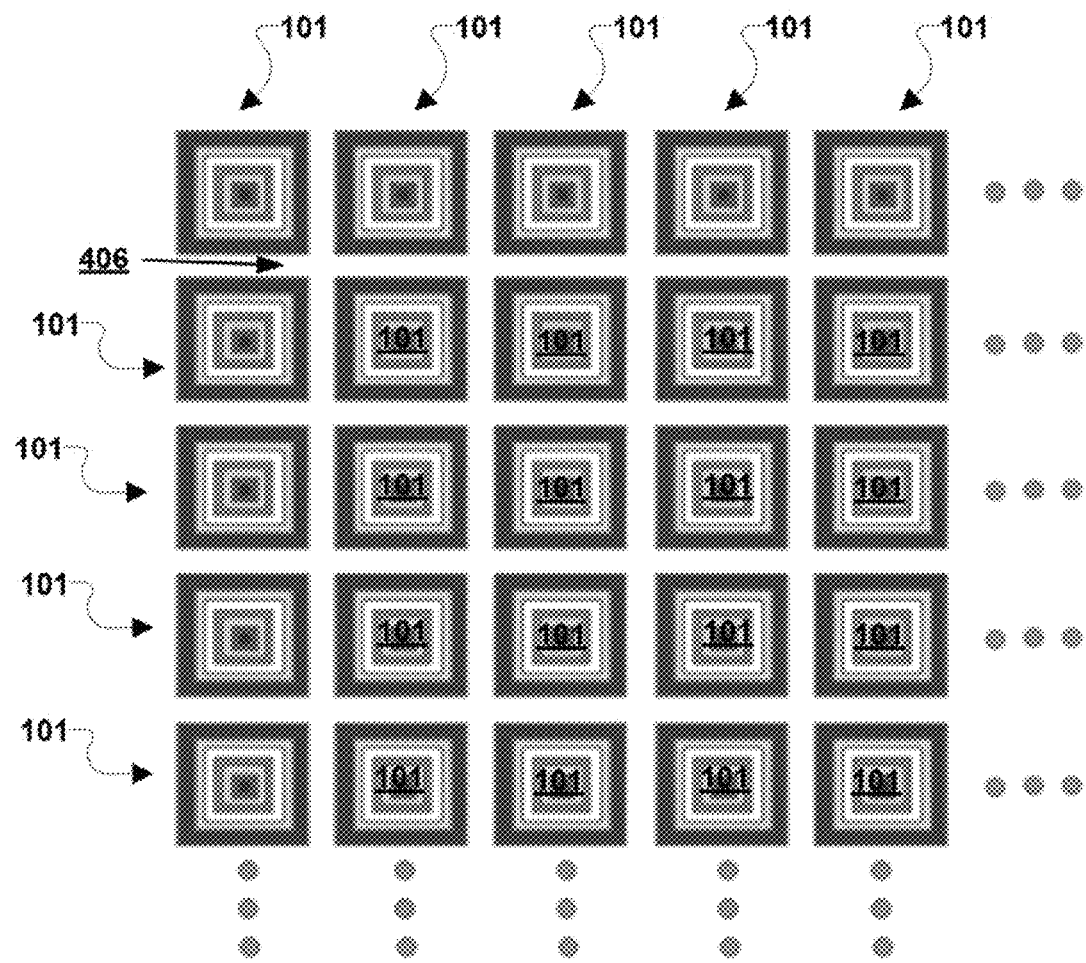
FIG. 6 is a cross section of the fission process reactor units of FIG. 4 having square cross section shapes according to an embodiment.

FIG. 4 is component block diagram illustrating a cross section of an embodiment fission process reactor system 400 including multiple fission process reactor units 100. FIG. 4 shows five (5) or more in an array of fission process reactor units 101 in a side view within the containment vessel 402 and additional fission process reactor units 101 may be arranged in rows behind the visible fission process reactor units 101. For example, FIGS. 5 and 6 show overhead views of a cross sections of the fission process reactor units 101 of the system 400 shown in FIG. 4 along the axis B. FIGS. 5 and 6 show that five or more rows of five or more fission process reactor units 101 (i.e., circular cross section fission process reactor units 101 in FIG. 5 and square cross section fission process reactor units 101 in FIG. 6) may provide an array of 25 fission process reactor units 101 in a cluster configuration within the containment vessel 402. As illustrated in FIGS. 4, 5, and 6 by the additional dots to the sides of the fission process reactor units 101, additional fission process reactor units 101 may be added to the system 400 as desired. The containment vessel 402 may be similar to the containment vessel 109 and may be filed with a fluid, such as high pressure gas (e.g., Ar gas, He gas, etc.) or any other type coolant medium, that may be circulated, such as by a circulation pump 111, to remove waste thermal energy from the fission process reactor units 101. The fluid may flow through coolant channels 406 created between the fission process reactor units 101 by the arrangement of the fission process reactor units 101 in the containment unit 402.

Each NTAC in the cluster configurations shown in FIGS. 4, 5, and 6 may include electrical lead connections connected to its photoionic electron emitter 502 and electron getter electrode 108, respectively, which may be connected to a DC bus of the system 400 to enable each NTAC in the cluster to provide DC power to the DC bus. Similarly, each thermoelectric generator 107 in the cluster of fission process reactor units 101 may include electrical lead connections which may be connected to the DC bus to provide DC power from each thermoelectric generator 107 to the DC bus. Connecting all the NTACs and all the thermoelectric generators 107 of the fission process reactor units 101 within the system 400 to the DC bus (i.e., connecting all the fission process reactor units 101 to the DC bus) may enable the system 100 to provide tandem power (i.e., avalanche cell power and thermoelectric power) via the DC bus.

While FIGS. 2, 3, 5, and 6 illustrate examples of circular cross section and square cross section fission process reactor units 101, other cross sectional configurations may be used in various embodiments, and the cross sections need not be concentric configurations of the layers in the fission process reactor units 101 (i.e., the fuel rod 103, the primary neutron source rod 102, the Co-59 layer 105, the photoionic electron emitter 106, the thermionic vacuum gap 104, the electron getter electrode 108, and the thermoelectric generator 107).

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the disclosure. Thus, the embodiments shown herein are not intended to be limiting but are to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fission process reactor unit, comprising:
   a radioactive element;
   a cobalt 59 (Co-59) layer;
   a Nuclear Thermionic Avalanche Cell (NTAC); and
   a thermoelectric generator,
   wherein:
      a fission process of the radioactive element releases neutrons to the Co-59 layer to breed cobalt 60 (Co-60);
      the NTAC receives gamma rays from the fission process, a by-product of the fission process, and the bred Co-60 to generate direct current (DC) power; and
      the thermoelectric generator receives thermal energy from the radioactive element and the NTAC to generate DC power.

2. The fission process reactor unit of claim 1, wherein the radioactive element comprises uranium 235 (U-235) and the by-product of the fission process is cesium 137 (Cs-137).

3. The fission process reactor unit of claim 2, wherein the U-235 is a fuel rod and the fission process is controlled by a primary neutron source rod controllably inserted or removed from the fuel rod.

4. The fission process reactor unit of claim 3, wherein the Co-59 layer at least partially encircles the U-235 fuel rod.

5. The fission process reactor unit of claim 4, wherein the Co-59 layer is disposed between the U-235 fuel rod and the NTAC.

6. The fission process reactor unit of claim 5, wherein the NTAC is disposed between the Co-59 layer and the thermoelectric generator.

7. The fission process reactor unit of claim 6, wherein the NTAC and the thermoelectric generator are connected in tandem to a same DC bus or load.

8. The fission process reactor unit of claim 6, wherein the NTAC comprises a photoionic electron emitter separated from an electron getter electrode by a thermionic vacuum gap.

9. A reactor system, comprising:
   a containment vessel; and
   one or more fission process reactor units supported within the containment vessel, each of the one or more fission process reactor units comprising:
      a radioactive element;
      a cobalt 59 (Co-59) layer;
      a Nuclear Thermionic Avalanche Cell (NTAC); and
      a thermoelectric generator,
      wherein:
         a fission process of the radioactive element releases neutrons to the Co-59 layer to breed cobalt 60 (Co-60);
         the NTAC receives gamma rays from the fission process, a by-product of the fission process, and the bred Co-60 to generate direct current (DC) power; and
         the thermoelectric generator receives thermal energy from the radioactive element and the NTAC to generate DC power.

10. The reactor system of claim 9, wherein the one or more fission process reactor units are twenty five or more fission process reactor units.

11. The reactor system of claim 9, wherein the radioactive element comprises uranium 235 (U-235) and the by-product of the fission process is cesium 137 (Cs-137).

12. The reactor system of claim 11, wherein the Co-59 layer at least partially encircles the U-235 fuel rod.

13. The reactor system of claim 12, wherein the Co-59 layer is disposed between the U-235 fuel rod and the NTAC and the NTAC is disposed between the Co-59 layer and the thermoelectric generator.

14. The reactor system of claim 13, wherein each of the one or more fission process reactor units are connected to a same DC bus.

15. The reactor system of claim 14, wherein the NTAC comprises a photoionic electron emitter separated from an electron getter electrode by a thermionic vacuum gap.

16. The reactor system of claim 9, further comprising a fluid circulated within the containment vessel.

17. The reactor system of claim 16, wherein the fluid is argon gas.

* * * * *